US008418190B2

(12) United States Patent
Rivard et al.

(10) Patent No.: US 8,418,190 B2
(45) Date of Patent: Apr. 9, 2013

(54) RESPONSIVE USER INTERFACE WITH BACKGROUND APPLICATION LOGIC FOR WORKING ON AN OBJECT

(75) Inventors: John J. Rivard, Redmond, WA (US); Stephen W. Provine, Seattle, WA (US); Steven P. Anonsen, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 636 days.

(21) Appl. No.: 12/624,463

(22) Filed: Nov. 24, 2009

(65) Prior Publication Data
US 2011/0126210 A1 May 26, 2011

(51) Int. Cl.
*G06F 9/46* (2006.01)
(52) U.S. Cl.
USPC .......................................... 718/108; 718/100
(58) Field of Classification Search .................. 718/100, 718/108
See application file for complete search history.

(56) References Cited

U.S. PATENT DOCUMENTS

| | | | | |
|---|---|---|---|---|
| 5,930,794 | A * | 7/1999 | Linenbach et al. | 1/1 |
| 6,480,847 | B1 * | 11/2002 | Linenbach et al. | 707/600 |
| 6,850,257 | B1 | 2/2005 | Colleran et al. | |
| 7,426,735 | B2 | 9/2008 | Bliss et al. | |
| 7,573,295 | B1 | 8/2009 | Stadler | |
| 7,774,307 | B2 * | 8/2010 | Ju et al. | 707/616 |
| 7,895,599 | B2 * | 2/2011 | Muscarella | 719/313 |
| 2004/0049579 | A1 * | 3/2004 | Ims et al. | 709/225 |
| 2005/0091611 | A1 | 4/2005 | Colleran et al. | |
| 2005/0192973 | A1 | 9/2005 | Sperling et al. | |
| 2007/0250304 | A1 | 10/2007 | Elfner et al. | |
| 2008/0178125 | A1 | 7/2008 | Elsbree et al. | |
| 2009/0254807 | A1 * | 10/2009 | Singh et al. | 715/234 |

OTHER PUBLICATIONS

Griffiths, Ian, "Give Your.NET-based Application a Fast and Responsive UI with Multiple Threads", Retrieved at <<http://msdn.microsoft.com/en-us/magazine/cc300429.aspx>>, Feb. 2003, pp. 15.
Clark, Jason, "Maintaining a Responsive UI", Retrieved at <<http://www.codeguru.com/csharp/csharp/cs_misc/userinterface/print.php/c4255>>, Aug. 5, 2003, pp. 8.
Yu, et al. , "XUPClient—A Thin Client for Rich Internet Applications", Retrieved at <<http://www.cse.unsw.edu.au/~jyu/wise06/WISE059.pdf>>, Sep. 1, 2007, pp. 15.
Lhotka, Rockford, "Parallel and Concurrency Futures for Microsoft Developers", Retrieved at <<http://www.devx.com/SpecialReports/Article/40965/1954>>, Sep. 14, 2009, pp. 6.

(Continued)

*Primary Examiner* — Van Nguyen
(74) *Attorney, Agent, or Firm* — Jared S. Goff

(57) ABSTRACT

A user interface can be maintained in a responsive state on a user interface thread while synchronous application logic is running on a background thread. The application logic can access an object on the background thread, and the user interface can access the same object on the user interface thread. Additionally, a request for work to be done on an object can be received. If the request is to be dispatched to a background thread, then the work can be dispatched to the background thread without blocking the user interface thread. However, if the request is to be dispatched to the user interface thread, then the work can be dispatched to the user interface thread, and the background thread can be blocked.

20 Claims, 8 Drawing Sheets

OTHER PUBLICATIONS

Foord, Michael, "The Silverlight APIs: Experimenting with the IronPython Web IDE", Retrieved at <<http://www.voidspace.org.uk/ironpython/silverlight/silverlight_api.shtml#silverlight-and-threading>>, Sep. 14, 2009, pp. 10.

International Searching Authority, "International Search Report and Written Opinion", PCT/US2010/054727, Applicant Reference No. 327889-02, Mailing Date: Jun. 23, 2011, 9 Pages.

* cited by examiner

# RESPONSIVE USER INTERFACE WITH BACKGROUND APPLICATION LOGIC FOR WORKING ON AN OBJECT

BACKGROUND

End users expect modern connected applications to be responsive even with multiple tasks being active at the same time. To address this expectation, some developers learn and implement asynchronous patterns and architectures, which can allow a user interface to be unblocked while application logic is running. Average developers are used to synchronous patterns and architectures, where all tasks are executed in a serial manner. Asynchronous patterns and architectures can be difficult for such developers to understand and correctly implement.

SUMMARY

Whatever the advantages of previous user interface and application logic tools and techniques, they have neither recognized the tools and techniques for a responsive user interface with background application logic described and claimed herein, nor the advantages produced by such tools and techniques.

In one embodiment, the tools and techniques can include maintaining a user interface in a responsive state on a user interface thread while running synchronous application logic on a background thread. The application logic can access an object on the background thread, and the user interface can access the same object on the user interface thread. As used herein, a user interface is considered to be in a responsive state when it is able to respond to user input and updates. Synchronous application logic is logic for an application that can operate correctly if tasks are performed in an order prescribed in the logic. As used herein, an object is an entity, such as a value, variable, function, or data structure, which can be manipulated by one or more threads in a computing environment, such as a thread running a user interface and/or a thread running application logic.

In another embodiment of the tools and techniques, a request for work to be done on an object can be received. Work is used broadly to refer to any type of manipulation of an object, such as modifying the object, loading information from the object, etc. It can be determined whether the work is to be dispatched to at least one background thread running application logic or to at least one user interface thread running one or more user interface elements. If the request is to be dispatched to the at least one background thread, then the work can be dispatched to the at least one background thread without blocking the at least one user interface thread. However, if the request is to be dispatched to the at least one user interface thread, then the work can be dispatched to the at least one user interface thread, and the at least one background thread can be blocked.

In yet another embodiment of the tools and techniques, one or more user interface elements can be run on a user interface thread. The user interface element(s) can represent at least a portion of a business object. Business logic can be applied to the business object on a background thread, and the business object can be modified on the user interface thread. The background thread can be blocked while the object is modified on the user interface thread. As used herein, a business object is an object that represents one or more business items, such as a person (customer, vendor, employee, etc.), an invoice, a conference room, a building, etc. Business logic is application logic that is applied to one or more business objects, such as logic applied so that an object operates as expected for the type of business item(s) the object represents, or logic applied so that the object configures to rules of a particular business entity (rules for which user objects can access a particular type of invoice, etc.).

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
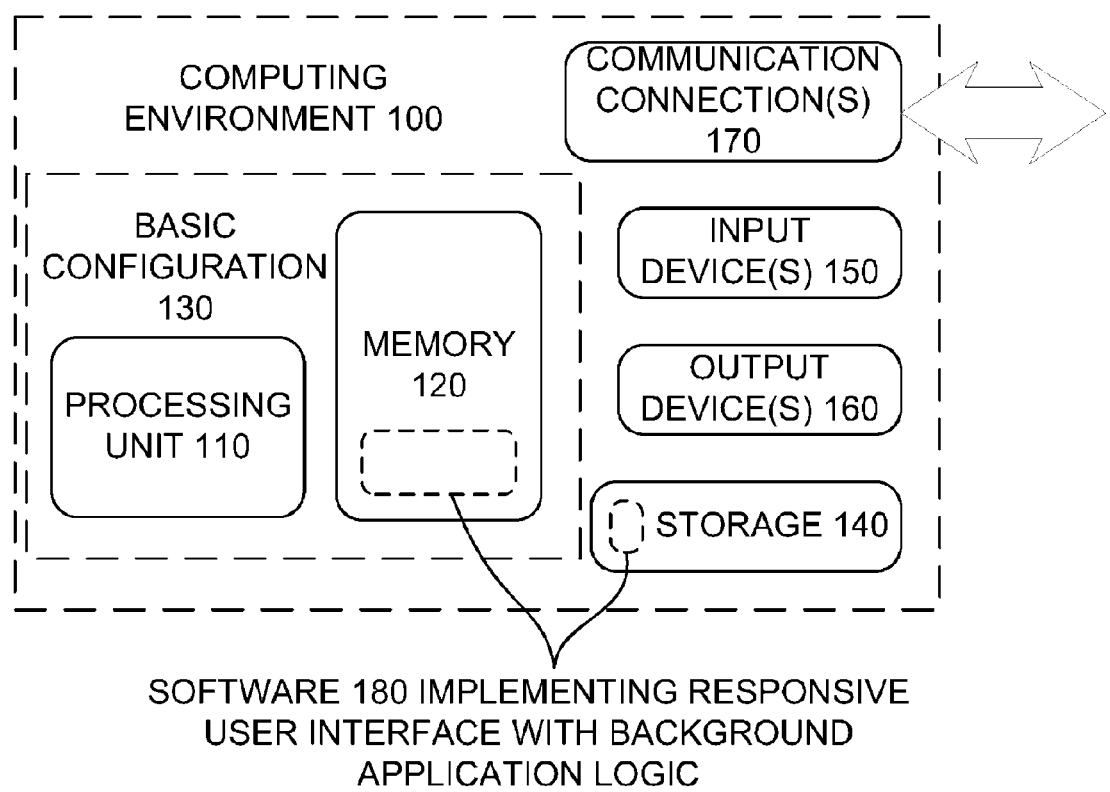
FIG. 1 is a block diagram of a suitable computing environment in which one or more of the described embodiments may be implemented.

Embodiments described herein are directed to improved techniques and tools for allowing a user interface to remain responsive while application logic is running in the background. This may be done without the application logic developer needing to have an understanding of asynchronous development techniques. Such improvements and/or others may result from the use of various techniques and tools separately or in combination.

Such techniques and tools may include having an object that can be accessed by a user interface thread and a background thread. Synchronous application logic can be run on the background thread. Thus, the developer of that application logic may not implement or even understand asynchronous patterns and coding techniques. While the application logic is running on the background thread, a user interface can be maintained in a responsive state on the user interface thread. The user interface thread can be running even when the background thread is executing application logic related to the object.

When the user interface thread receives user input requesting that the object be manipulated, the user interface thread can fulfill the request asynchronously by forwarding the user input to the background thread and then proceeding without synchronously waiting for the manipulation code to complete. Forwarding and/or sending communications, such as requests, user input, etc., may include translating the communication into a different form, combining it with other communications, separating it into parts, etc. The background thread can process the user input with the application logic. If the object is to be manipulated, then the background thread may directly access the object and manipulate it. However, in some situations, a user interface element may need to be notified on the user interface thread that the object has been manipulated. If so, a work request can be sent to the user interface thread for the user interface thread to perform the manipulation itself so that change notifications can be raised on the user interface thread, as expected. In this case, the background thread can synchronously wait for the user interface thread to complete the manipulation.

Communications between the user interface and background threads may be conducted through the object. Accordingly, the background and user interface threads can each interact with the object as they would normally interact with application objects. However, the object can include functionality to interact with both threads, and to pass tasks and communications between the two threads.

Accordingly, one or more substantial benefits may be realized from the tools and techniques described herein. For example, developers can develop synchronous application logic to run on the background thread. For example, the functionality of the objects to interact with multiple threads can be built into a software development system, such as Microsoft's Visual Studio® development system. A developer can use the development system to develop an application with application logic provided by the developer and/or the development system, such as an application developed in the Visual Studio® development system to run on Microsoft's Silverlight® browser plug-in. However, other types of applications and/or other types of software development systems could be used. Regardless of the specific development system and/or application type, developers can structure the application logic synchronously. However, as noted above, the tools and techniques described herein can allow the user interface to forward to the background thread user input that requests object manipulation, and to proceed without synchronously waiting for the manipulation code to complete the requested manipulation. Accordingly, the user interface thread and the user interface elements running on the user interface thread can be responsive, even while application logic is running in the background thread.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. For example, the various tools and techniques described herein may be implemented with hardware or software, or a combination of both. Moreover, for the sake of simplicity, flowcharts may not show the various ways in which particular techniques can be used in conjunction with other techniques.

I. Exemplary Computing Environment

FIG. 1 illustrates a generalized example of a suitable computing environment (100) in which one or more of the described embodiments may be implemented. For example, one or more such computing environments can be used as an environment for a responsive user interface with background application logic. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing a responsive user interface with background application logic, such as synchronous background application logic.

Although the various blocks of FIG. 1 are shown with lines for the sake of clarity, in reality, delineating various components is not so clear and, metaphorically, the lines of FIG. 1 and the other figures discussed below would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," "send," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. System and Environment for Responsive User Interface with Application Logic

Figure 2:
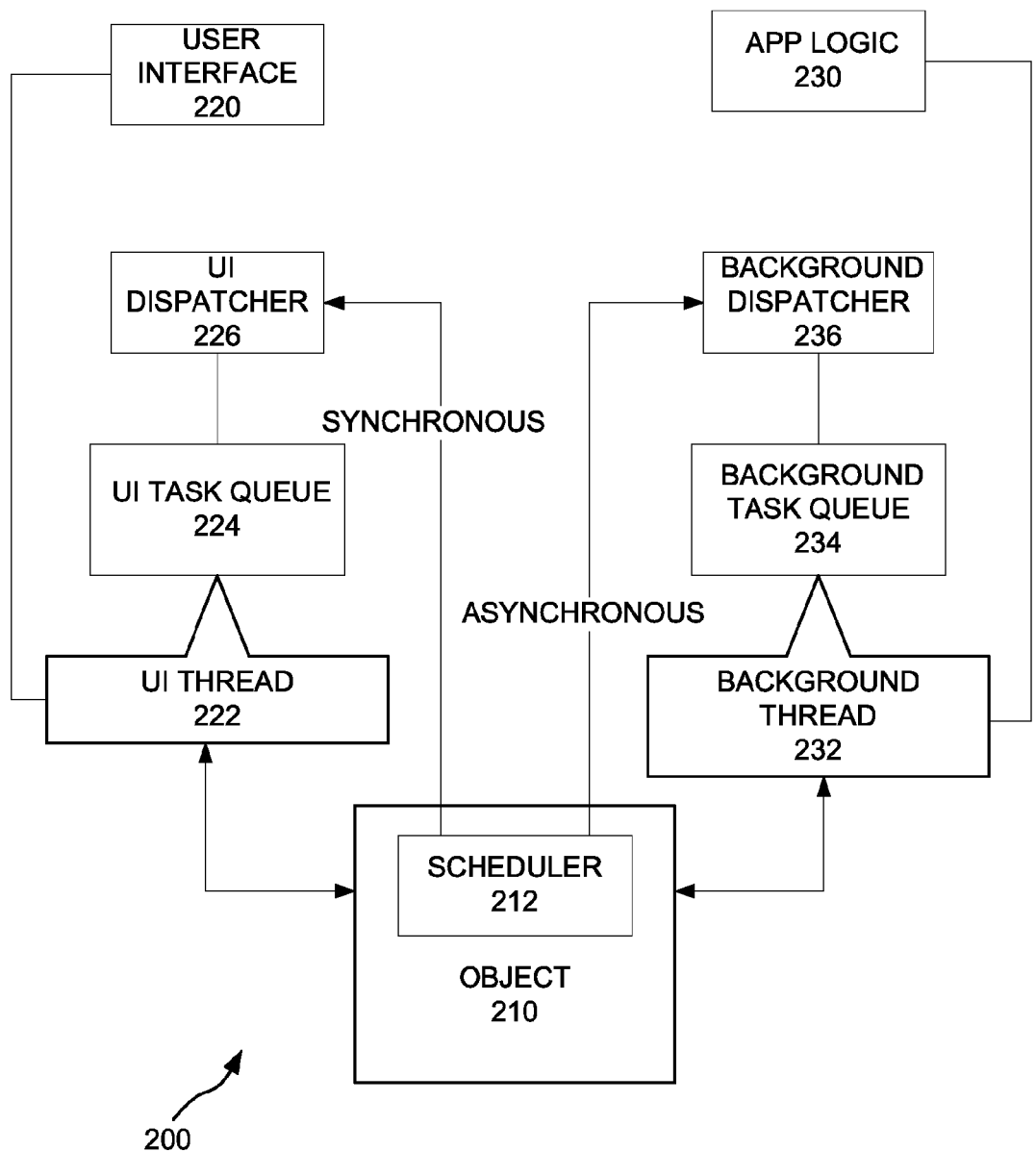
FIG. 2 is a block diagram of a computing environment in conjunction with which one or more of the described embodiments may be implemented.

FIG. 2 is a block diagram of a computing environment (200) in conjunction with which one or more of the described embodiments may be implemented, such as by maintaining a user interface in a responsive state while running background application logic. The computing environment (200) can include an application object (210), such as a business object. The object (210) can include a scheduler (212), which can operate to schedule tasks on multiple threads, as will be discussed more below. Alternatively, the scheduler may be outside the object (210).

A. User Interface Components

A user interface (220) can include one or more user interface elements, which can represent at least a portion of the object (210). For example, the user interface may include one or more standard user interface elements (lists, checkboxes, text boxes, buttons, diagrams, pictures, etc.) representing one or more data fields in the object (210). The user interface can run on a user interface thread (222), or possibly on multiple user interface threads (not shown), such as in a thread pool. The user interface thread (222) may be dedicated to the user interface (220), or it may be shared, such as with other user interfaces. The user interface thread (222) can receive tasks from a user interface task queue (224) according to standard queuing practices (first-in-first-out ordering, etc.). A user interface dispatcher (226) can receive tasks from the scheduler (212) in the object (210), and can enter them in the user interface task queue (224) to be executed on the user interface thread (222). Also, the user interface thread (222) can access the object (210), such as to pass modification or access requests to the object (210). Notifications can also be raised for one or more listeners (such as the user interface (220)) on the user interface thread (222) when the object (210) is manipulated, such as by having information from the object loaded or by modifying the object (210).

B. Logic and Background Components

Application logic (230), such as business logic, can run on the background thread (232) and can be applied to the object (210). For example, the application logic (230) may include standard logic that controls the modification of and access to the object (210). The application logic (230) can run on a background thread (232). Indeed, the application logic (230) can run on multiple background threads (232), such as in a thread pool configuration, and the thread(s) may or may not be dedicated to running the application logic (230). A background task queue (234) can provide tasks to the background thread (232) according to standard queuing practices (first-in-first-out ordering, etc.). A background dispatcher (236) can receive tasks from the scheduler (212) in the object (210), and can enter them in the background task queue (234) to be executed on the background thread (232). Also, the background thread (232) can access the object (210), such as to pass modification or access requests to the object (210). Notifications can also be raised for one or more listeners (such as listeners from the application logic (230)) on the background thread (232) when the object (210) is manipulated.

C. Object Interaction with the User Interface and Background Threads

The operation of the object (210) and the interaction of its scheduler (212) with the user interface dispatcher (226) and the background dispatcher (236) can allow the synchronous application logic (230) to run on the background thread (232) in an asynchronous manner (i.e., the application logic (230) can run on the background thread (232) while the user interface (220) remains unblocked and responsive on the user interface thread (222)). Work can be dispatched to the user interface dispatcher (226) to run in a synchronous manner when the work is initiated by the background thread (232) (i.e., the user interface thread (222) can perform dispatched work from the background thread (232) while the background thread (232) is blocked). This can allow conflicts between the threads (222 and 232) to be avoided because the background thread (232) can be blocked while the user interface thread (222) actually manipulates the object (210). Moreover, the user interface (220) can remain responsive while the application logic (230) is running, even though the application logic (230) is synchronous.

The scheduler (212) can have an implicit awareness of both the user interface dispatcher (226) and the background dispatcher (236) for the object (210). As will be discussed in more detail below, the object (210) can have defined behavior for being accessed from either the user interface thread (222)

or the background thread (232), so that both user interface data binding and background application logic tasks can work concurrently. Thus, the object (210) can manage common operations from the perspective of either thread (222 or 232), and can orchestrate work between the user interface dispatcher (226) and the background dispatcher (236) so that each thread (222 and 232) can see a consistent view of the business object (210) without being aware of the other thread (222 or 232).

The object (210) can operate so that the user interface thread is not blocked, even when application logic (230) is being run on the object (210). The application logic (230) can be executed by the background dispatcher (236) on a background thread (232). This execution of application logic (230) can include commands, data validation, property calculations, data access, etc. Tasks for the user interface (220), such as data binding and the execution of user interface elements, can be executed by the user interface dispatcher (226) on the user interface thread (222). The user interface thread (222) and the background thread (232) may initiate property gets and sets, and command invocation on the business object (210). Additionally, the user interface thread (222) and the background thread (232) can listen on change events for the object (210), such as property and list change events. Notifications can be raised on the listener's own thread (222 or 232).

Additionally, the object (210) and its scheduler (212) can move work back and forth between the dispatchers (226 and 236), and can block the background thread as needed. This configuration can allow both the user interface (220) and the application logic (230) to see a consistent view of the object (210), and to allow the user interface (220) to remain responsive even when the application logic (230) is running on the object (210).

With these features of the computing environment (200), one or more benefits may be realized. For example, both the user interface thread (222) and the background thread (232) can see a consistent state of the business object (210), without data races or cache coherency issues between threads. The application logic (230) can be written as if it was to run in a synchronous environment, even though it can run at the same time the user interface (220) is responsive.

Thus a developer of the application logic (230) can write it in a synchronous manner, and can typically interact with just the current background thread (232) while debugging. Moreover, for an end user, the user interface (220) can remain responsive and largely consistent with the true state of the object (210), as represented by the background thread (232). An application running the application logic (230) and user interface (220) can run without hanging when the application logic (230) is running, and the user interface (220) can refresh immediately to indicate changes to the current state of the business object (210).

While the user interface (220) can remain largely consistent, there may be some time lags in updating information on the user interface (220) while updates to the information are being processed by the background thread (232). If the time lag is too long, the user interface (220) may inform a user that the background thread is working (such as by updating a value). This could be done by the user interface (220) asking the background dispatcher (236) if it is currently processing, and if so, then informing the user that the value may be changed. For example, the user interface could present an intermediate pending state if there is pending work.

An application may interact with multiple objects (210). In one configuration, each such object (210) can have its own dedicated background dispatcher (236). Alternatively, a more complex background dispatcher (236) may be able to interact with multiple objects. This may also involve a more complex object (210), such as an object including a more complex scheduler (212). An application may also have multiple user interfaces (220), such as where an application has multiple screens and each screen is considered a separate user interface (220). Each such user interface (220) may have its own dedicated user interface dispatcher (226) dispatching tasks to one or more threads. Again, however, a more complex user interface dispatcher (226) and/or a more complex object (210) could allow a user interface dispatcher (226) to be shared among multiple user interfaces (220) and/or multiple user interface threads (222).

III. Dual-Threaded Data Reads and Writes

Figure 3:
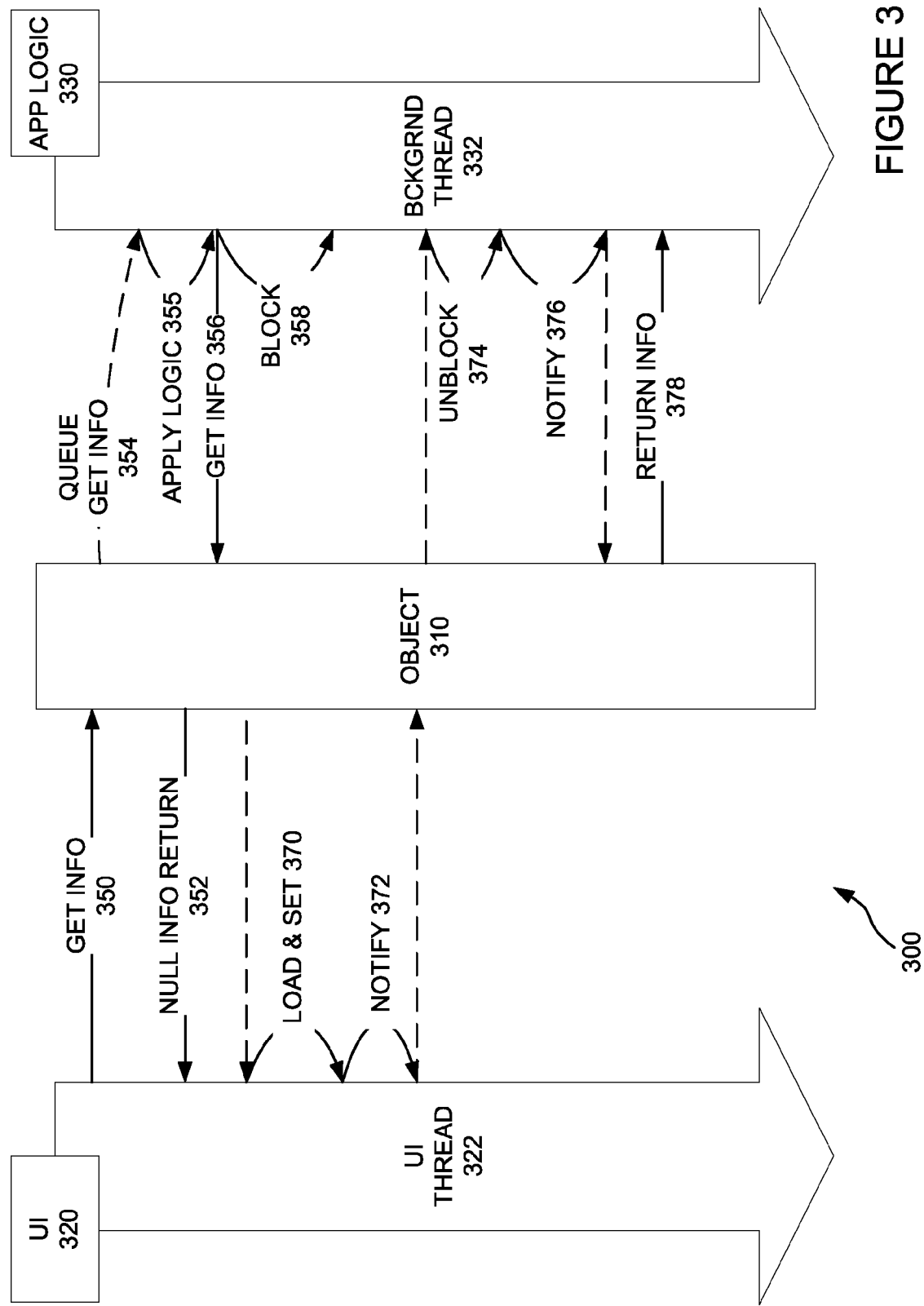
FIG. 3 is a schematic diagram illustrating an example of a technique for performing dual-threaded data reads of information from an object.
Figure 4:
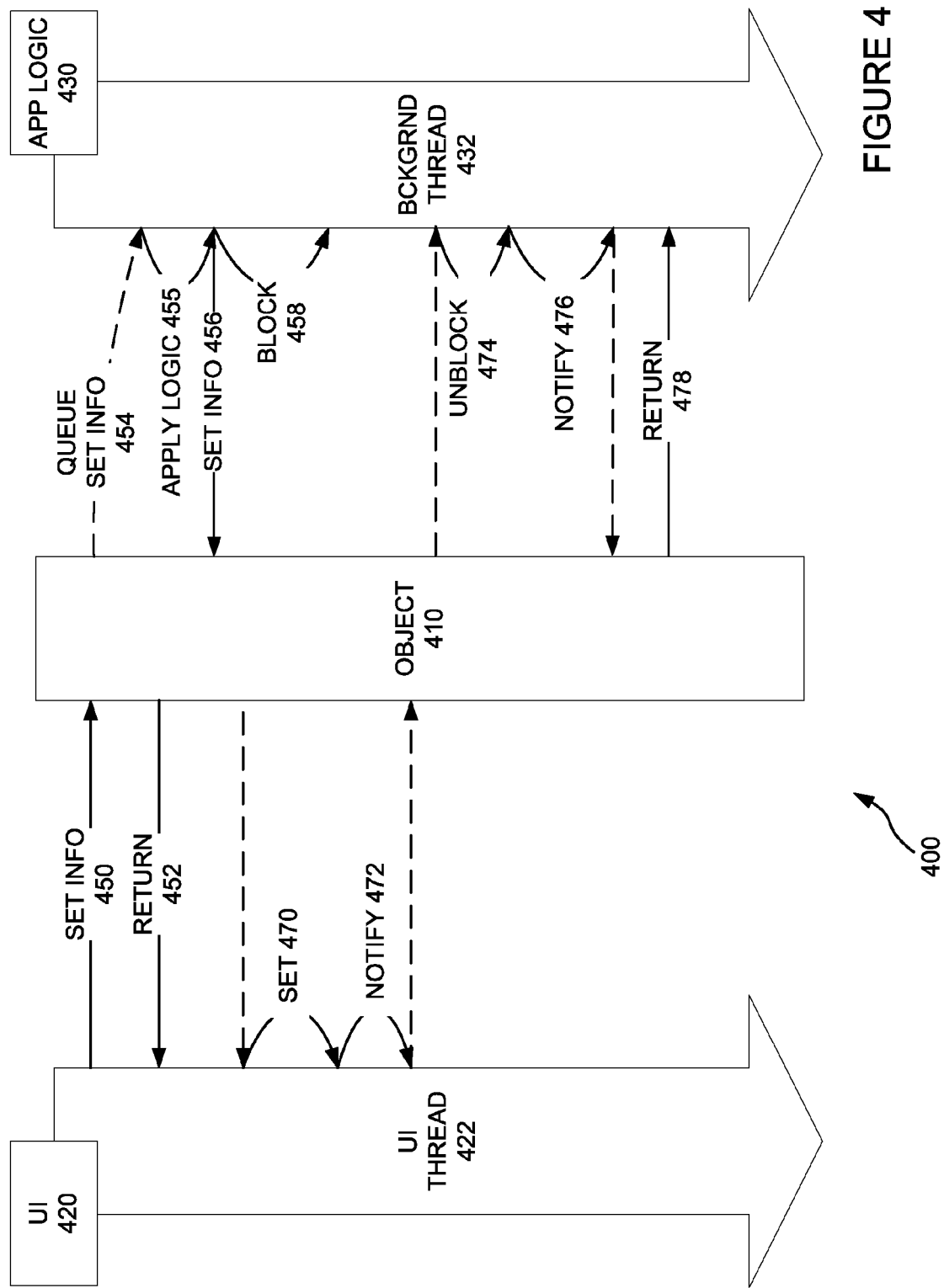
FIG. 4 is a schematic diagram illustrating an example of a technique for performing dual-threaded data writes of information to an object.

Techniques for dual-threaded data reads and writes of objects will now be discussed with reference to FIGS. 3 and 4. FIGS. 3 and 4 are simplified to omit details, such as user interface and background dispatchers, and an object scheduler. However, user interface and background dispatchers can be used to dispatch tasks to the respective threads, and a scheduler in the object can schedule tasks between the different threads/dispatchers for the techniques of FIGS. 3-4, as discussed above with reference to FIG. 2.

A. Dual-Threaded Data Reads of an Object

Referring now to FIG. 3, an example of a technique (300) for performing dual-threaded data reads of information from an object will be discussed. FIG. 3 illustrates an object (310) in the center. A user interface (320) can represent at least a portion of the object (310) and can run on a user interface thread (322), which is illustrated to the left of the object (310). To the right of the object (310), application logic (330) is illustrated running on a background thread (332). Actions that are later in time are shown lower in the figure in FIG. 3, as well as in FIG. 4 discussed below, although some reordering of the actions may be done in practice.

The user interface (320) may initiate a data read. For example, this may be done in response to user input requesting a user interface element to display information from the object (310). Accordingly, the user interface (320) can send a request (350) to the object (310) to get the information (such as information about a customer, information about an invoice, etc.). For example, this may include making an application programming interface (API) call to the object (310). The object (310) can recognize that the call came from a user interface thread (322), rather than a background thread. Accordingly, the object (310) can return the current information requested without loading the information. This can result in the object sending a null information return (352) to the user interface (320) on the user interface thread (322).

The object (310) can also forward the information request to the application logic (330) on the background thread (332) by queuing (354) the get request (350) to the background thread (332). In response to the get request (350) being queued (354) to the background thread (332), the application logic (330) can be applied (355) to the get request (350). For example, the application logic (330) may be applied (355) to determine whether a user is authorized to access the requested information under application logic (330). If the requested read of information is authorized, the application logic (330) running on the background thread (332) can send a get request (356) (such as by issuing an API call to the object (310)), requesting the information from the object (310).

The object can recognize that the get request (356) is from the background thread (332), and can block (358) the background thread (332), while loading and setting the object (310) on the user interface thread (322). For example, this may be done by the object (310) queuing a task on the user interface thread (322) that will result in the user interface thread (322) issuing a low level call to load and set the requested information from the object (310). The object (310) can recognize this low level call and, rather than forwarding it to the background thread (332), can load and set (370) the requested information on the user interface thread (322). This can result in a notification (372) of the change (the loading and setting of the requested information) being issued to one or more listeners on the user interface thread. The user interface (320) can receive the notification (372), and can respond by reading the newly-loaded information and updating any corresponding elements in the user interface (320).

In addition, the object (310) can unblock (374) the background thread and issue change notifications (376) to one or more listeners on the background thread. In addition, the requested information can be returned (378) to the application logic (330) in the background thread (332) in response to the get request (356).

In this technique, the application logic (330) can be applied synchronously in the background thread (332) to the request (350) to get information about the object. While this is being done, the user interface (320) can keep running on the user interface thread (322) without being blocked, so that the result is actually parallel operations of the background thread (332) and the user interface thread (322). Accordingly, the user interface (320) can remain responsive to a user's input, even while the application logic (330) is being applied to the get request (350). However, the background thread can be blocked (358) while the user interface thread (322) loads and sets (370) the requested information, so that conflicts between the two threads (322 and 332), such as data races, can be avoided. This can be done while allowing the application logic (330) to be structured in a synchronous manner, relieving the application logic developer from having to apply complex asynchronous coding techniques.

The background thread can also get data directly on the background thread without involving the user interface thread if the get is not expected to be done on the user interface thread. This may be done where a value is not being mutated by caching a value just retrieved or setting a value (such as where the data get request is for a value that has already been loaded). When receiving a request from the background thread to get data, the object can determine whether the get can be done on the background thread, or whether the get is to be done on the user interface thread.

B. Dual-Threaded Data Writes to an Object

Referring now to FIG. 4, an example of a technique (400) for performing dual-threaded data writes of information to an object will be discussed. Similarly to FIG. 3, FIG. 4 illustrates an object (410) in the center. A user interface (420) represents at least a portion of the object (410) and runs on a user interface thread (422), which is illustrated to the left of the object (410). To the right of the object (410), application logic (430) is illustrated running on a background thread (432).

The user interface (420) may initiate a data write, for example, in response to user input making a change to a user interface element corresponding to information in the object (410). Accordingly, the user interface (420) can send a set request (450) to the object (410) to modify the information by setting the new information in the object (410). For example, this may include making an API call to the object (410). The object (410) can recognize that the call came from a user interface thread (422), rather than a background thread. Accordingly, the object (410) can send a return (452) to the user interface (420) without actually setting the information.

The object (410) can also forward the information request to the application logic (430) on the background thread (432) by queuing (454) the set request (450) to the background thread (432). In response to the set request (450) being queued to the background thread (432), the application logic (430) can be applied (455) to the request. For example, the application logic (430) may be applied (455) to determine whether a user is authorized to modify the requested information under application logic, or to determine whether to initiate related modifications to the object (410) or one or more other objects. If the requested write of information is authorized, the application logic (430) running on the background thread (432) can send a set request (456) (such as by issuing an API call to the object (410)), requesting that the information be set.

The object (410) can recognize that the set request (456) is from the background thread (432), and can block (458) the background thread (432), while the object (410) is modified on the user interface thread (422). For example, this may be done by the object (410) queuing a task on the user interface thread (422) that will result in the user interface thread (422) issuing a low level call to modify the object (410) by setting the new information. The object (410) can recognize this low level call and, rather than forwarding it to the background thread (432), can set (470) the requested information on the user interface thread (422). This can result in a notification (472) of the change (the setting of the requested information) being issued to one or more listeners on the user interface thread (422). The user interface (420) can receive the notification (472), and can respond by reading the newly-set information and updating any corresponding elements in the user interface (420).

In addition, the object (410) can unblock (474) the background thread (432) and issue change notifications (476) to one or more listeners on the background thread (432). In addition, a return (478) can be sent to the application logic (430) in the background thread in response to the set request (456), reporting that the information was successfully set.

Similarly to the data read technique (300) above, in this data write technique (400) the application logic (430) can be applied synchronously in the background thread (432) to the request (450) to set information about the object (410). While this is being done, the user interface (420) can keep running on the user interface thread (422) without being blocked, so that the overall result is an asynchronous operation. Accordingly, the user interface (420) can remain responsive to a user's input, even while the application logic (430) is being applied to the set request (450). However, the background thread can be blocked (458) while the user interface thread (422) sets (470) the requested information, so that conflicts between the two threads (422 and 432), such as data races, can be avoided. This can be done while allowing the application logic (430) to be structured in a synchronous manner, relieving the application logic developer from having to apply complex asynchronous coding techniques.

The background thread can also set data directly on the background thread without involving the user interface if the value being set is independent in meaning to other values and does not create a potential inconsistency during inspection of the object by the user interface. When receiving a request from the background thread to set data, the object can determine whether it can be set on the background thread or whether it is to be set on the user interface thread.

IV. Techniques for Responsive User Interface with Background Application Logic

Figure 5:
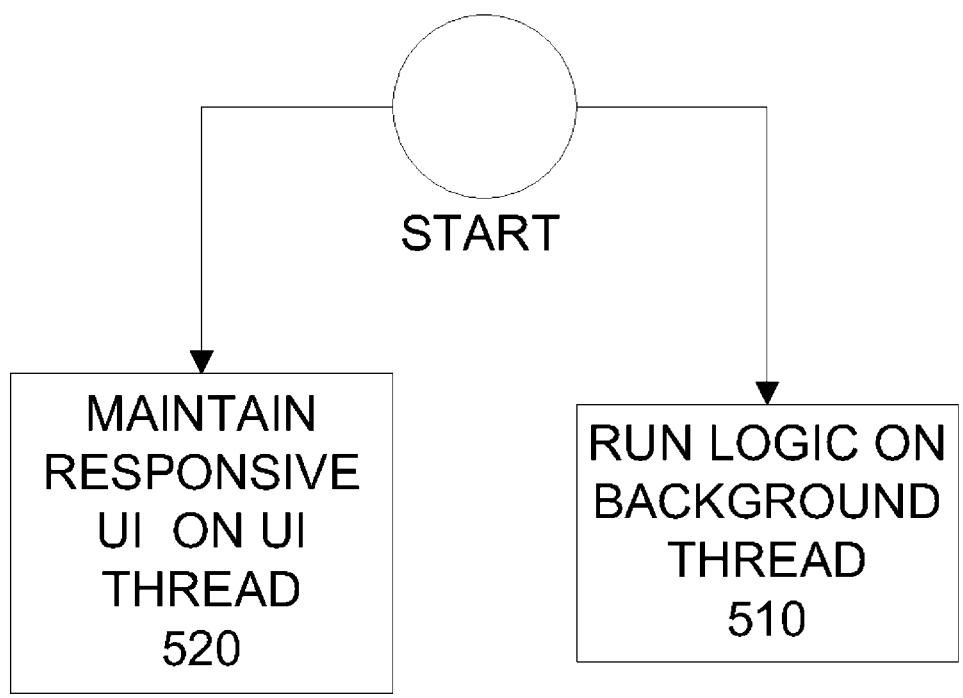
FIG. 5 is a flow diagram of a technique for a responsive user interface with background application logic.

A technique for a responsive user interface with background application logic will be discussed with reference to FIGS. 5 and 6. Referring first to FIG. 5, in the technique, synchronous application logic can be run (510) on at least one background thread, and the application logic can access an object. The object can be a business object, and the application logic can be business logic. While the application logic is running (510), a user interface can be maintained (520) in a responsive state on at least one user interface thread, and the user interface can access the object. Maintaining (520) the user interface in the responsive state can include not blocking the at least one user interface thread, and maintaining (520) can also include accessing the object on the at least one user interface thread.

Figure 6:
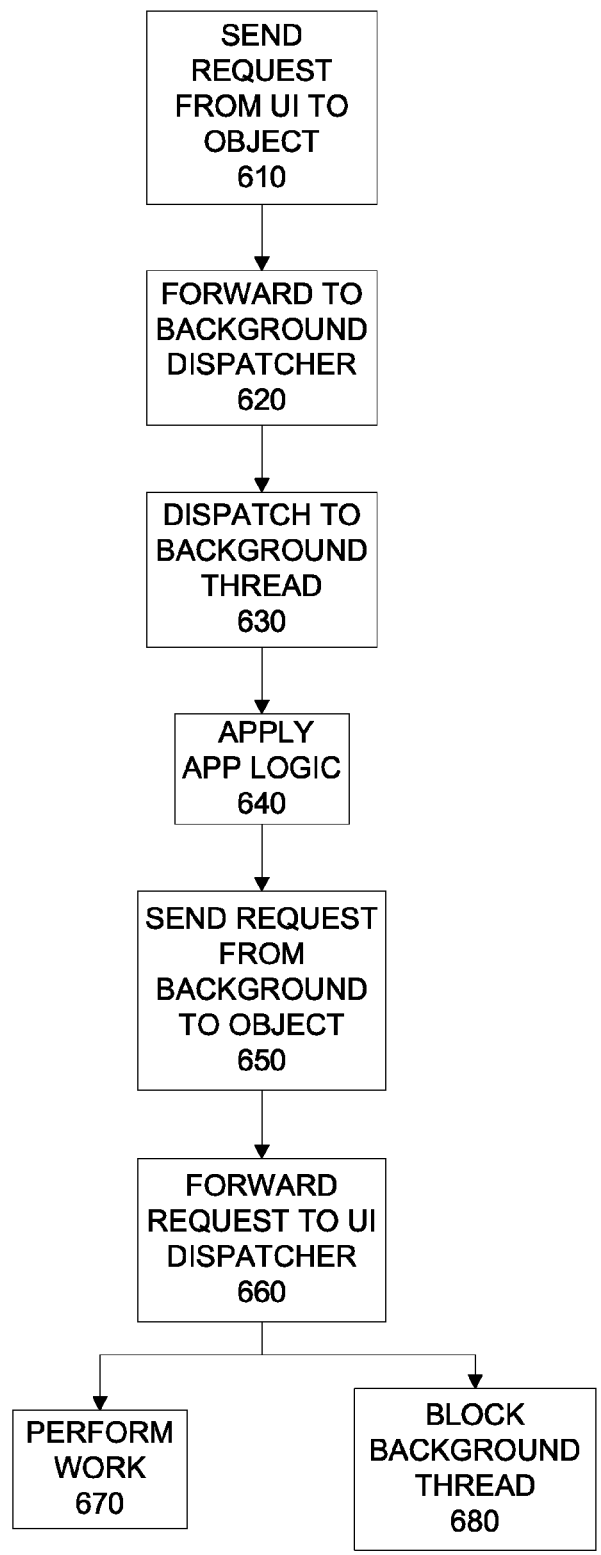
FIG. 6 is a flow diagram of another technique for a responsive user interface with background application logic.

Referring to FIG. 6, the technique can also include sending (610) a user input request from the at least one user interface thread to the object, and forwarding (620) the user input request from the object to a dispatcher for the at least one background thread. In addition, the technique can include, in response to receiving the user input request, dispatching (630) the user input request to a working thread of the at least one background thread, applying (640) the application logic to the user input request on the working thread, sending (650) a work request from the working thread to the object; and forwarding (660) the work request from the object to a dispatcher for the at least one user interface thread. The technique can also include performing (670) the work on the object (setting information in the object, loading information from the object, etc.) on the least one user interface thread in response to receiving the work request at the dispatcher for the at least one user interface thread. In addition, the at least one background thread can be blocked (680) while performing (670) the work on the at least one user interface thread. For example, if the at least one background thread is a thread pool, blocking may include blocking multiple threads or just blocking a thread that is actively processing the work.

Figure 7:
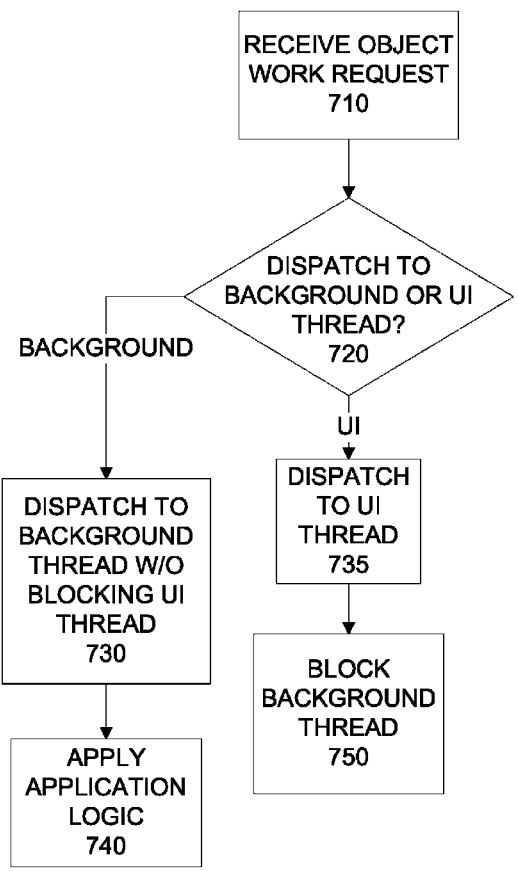
FIG. 7 is a flow diagram of yet another technique for a responsive user interface with background application logic.

Referring now to FIG. 7, another technique for a responsive user interface with background application logic will be discussed. In the technique, a request can be received (710) to do work on an object, such as a business object. For example, the work can include loading information from the object, setting information in the object, etc. The request can be received (710) at the object itself. It can be determined (720) whether the work is to be dispatched to at least one background thread running application logic (such as business logic) or to at least one user interface thread running one or more user interface elements. For example, determining (720) whether the work is to be dispatched to the at least one background thread or to the at least one user interface thread can include determining whether the request came from the at least one background thread or from the at least one user interface thread. If the request came from the at least one user interface thread without being handled by the at least one background thread, then determining (720) whether the work is to be dispatched to the at least one background thread or to the at least one user interface thread can include determining that the work is to be done by the at least one background thread.

If the request is to be dispatched to the at least one background thread, then the work can be dispatched (730) to the at least one background thread without blocking the at least one user interface thread. However, if the request is to be dispatched to the at least one user interface thread, then the work can be dispatched (735) to the at least one user interface thread, and the at least one background thread can be blocked (750).

If the work is dispatched (730) to the at least one background thread, then the technique can also include applying (740) the application logic to the request on the at least one background thread.

Figure 8:
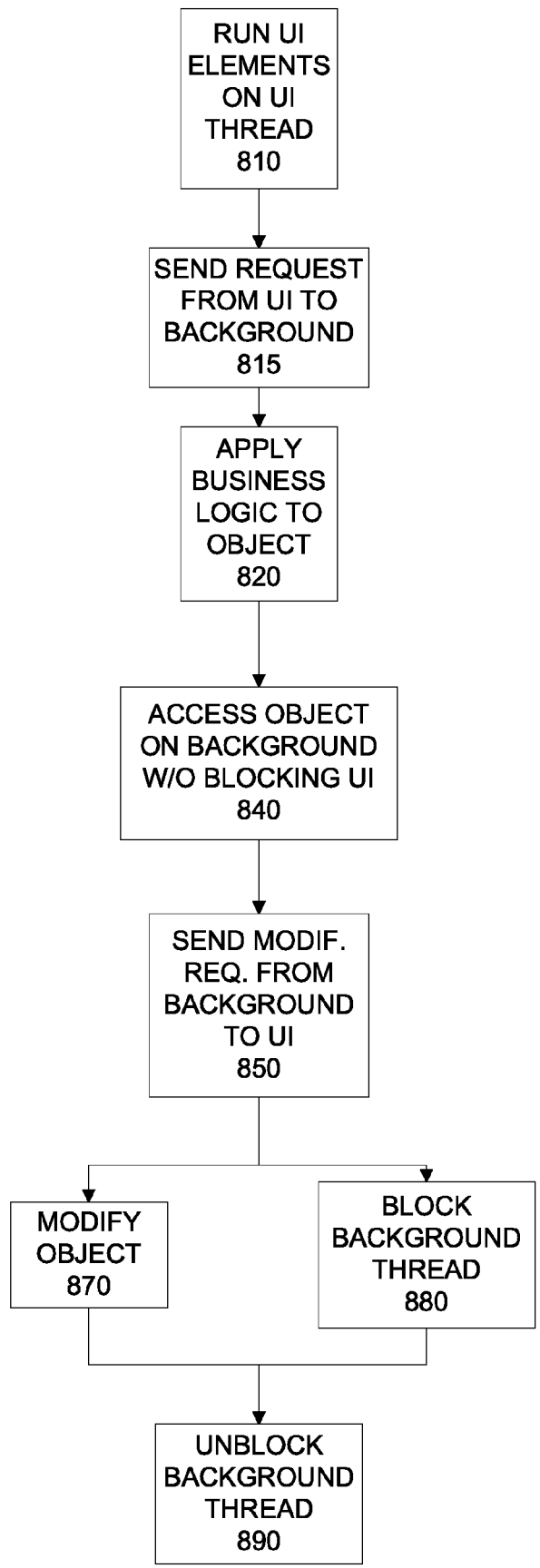
FIG. 8 is a flow diagram of yet another technique for a responsive user interface with background application logic.

Referring now to FIG. 8, yet another technique for a responsive user interface with background application logic will be discussed. The technique can include running (810) one or more user interface elements on at least one user interface thread. The one or more user interface elements can represent at least a portion of a business object. A user input request can be sent (815) from the at least one user interface thread to the at least one background thread. Business logic can be applied (820) to the business object on the at least one background thread, and the business object can be accessed (840) on the at least one background thread without blocking the at least one user interface thread. Also, a modification request can be sent (850) from the at least one background thread to the at least one user interface thread. For example, the modification request can be sent to the object and forwarded from the object to the at least one user interface thread. The modification request can be sent (850) in response to a user input request sent from the at least one user interface thread to the at least one background thread. Sending the user input request from the at least one user interface thread to the at least one background thread can include sending the user input request to the object and forwarding the user input request from the object to the at least one background thread.

The business object can be modified (870) on the at least one user interface thread, and the at least one background thread can be blocked (880) while the at least one user interface thread modifies the business object. The modification (870) can be done in response to the request from the at least one background thread. After the business object is modified (870), the at least one background thread may be unblocked (890).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer system comprising:
   at least one processor; and
   a memory comprising instructions stored thereon that when executed by the at least one processor cause the at least one processor to perform acts comprising:
   running synchronous application logic on at least one background thread, the application logic accessing an object on the at least one background thread; and
   while running the synchronous application logic on the at least one background thread, maintaining a user interface in a responsive state on at least one user interface thread, the user interface accessing the object on the at least one user interface thread, the responsive state of the user interface while running the synchronous application logic on the at least one background thread comprises the user interface being operable to initiate a modification of the object in response to user input requesting the modification of the object.

2. The computer system of claim 1, wherein maintaining the user interface in the responsive state comprises not blocking the at least one user interface thread.

3. The computer system of claim 1, wherein maintaining the user interface in the responsive state comprises accessing the object on the at least one user interface thread.

4. The computer system of claim 1, wherein the object is a business object and the application logic is business logic.

5. The computer system of claim 1, wherein the acts further comprise:

sending a user input request from the at least one user interface thread to the object; and forwarding the user input request from the object to a dispatcher for the at least one background thread.

6. The computer system of claim 5, wherein, in response to receiving the user input request at the dispatcher for the at least one background thread, the acts further comprise:

dispatching the user input request to a working thread of the at least one background thread;

applying the application logic to the user input request on the working thread;

in response to applying the application logic to the user input request, sending a work request from the working thread to the object; and forwarding the work request from the object to a dispatcher for the at least one user interface thread.

7. The computer system of claim 6, wherein the acts further comprise performing the work on the object on the at least one user interface thread in response to receiving the work request at the dispatcher for the at least one user interface thread.

8. The computer system of claim 7, wherein the acts further comprise blocking the at least one background thread while performing the work on the at least one user interface thread.

9. A computer-implemented method, comprising:

receiving a request for work to be done on an object;

a computer system determining whether the work is to be dispatched to at least one background thread running application logic or to at least one user interface thread running one or more user interface elements, determining whether the work is to be dispatched to the at least one background thread or to the at least one user interface thread comprising determining whether the request came from the at least one background thread or from the at least one user interface thread;

if the request is to be dispatched to the at least one background thread, then the computer system dispatching the work to the at least one background thread without blocking the at least one user interface thread; and if the request is to be dispatched to the at least one user interface thread, then the computer system dispatching the work to the at least one user interface thread and blocking the at least one background thread.

10. The method of claim 9, wherein if the request came from the at least one user interface thread without being handled by the at least one background thread, then determining whether the work is to be dispatched to the at least one background thread or to the at least one user interface thread comprises determining that the work is to be done by the at least one background thread.

11. The method of claim 9, wherein the object is a business object and the application logic is business logic, and the method further comprises applying the business logic to the request on the at least one background thread if the work is dispatched to the at least one background thread.

12. The method of claim 9, wherein the request is received at the object.

13. The method of claim 9, wherein the work comprises modifying the object.

14. The method of claim 9, wherein, if it is determined that the request came from the at least one background thread, then the method includes determining that the request is to be dispatched to the at least one user interface thread.

15. A computer-implemented method comprising:

receiving user input at a user interface running on at least one user interface thread in a computer system, the user input requesting work to be done on an object;

in response to receiving the user input at the user interface, the computer system forwarding a first work request from the at least one user interface thread to at least one background thread running application logic, the first work request requesting the work to be performed on the object;

in response to receiving the first work request at the at least one background thread, the computer system running the application logic on the first work request in the at least one background thread and forwarding a second work request from the at least one background thread to the at least one user interface thread, the second work request requesting the work to be performed on the object; and in response to receiving the second work request from the at least one background thread at the at least one user interface thread, the computer system performing at least a portion of the work on the object using the at least one user interface thread.

16. The method of claim 15, wherein the work comprises performing a modification of the object.

17. The method of claim 16, wherein performing at least a portion of the work on the object comprises performing the modification of the object.

18. The method of claim 15, wherein the application logic is synchronous application logic and wherein the method further comprises, while running the application logic on the first work request in the at least one background thread, maintaining the user interface in a responsive state on the at least one user interface thread.

19. The method of claim 18, wherein the user input is a first user input, and wherein the method further comprises:

receiving a second user input at the user interface while running the synchronous application logic on the at least one background thread, the second user input requesting a modification of the object; and initiating the modification of the object in response to receiving the second user input, initiating the modification being done while running the synchronous application logic on the at least one background thread.

20. The method of claim 15, wherein the object is a business object and the application logic is business logic.

* * * * *